UNITED STATES PATENT OFFICE.

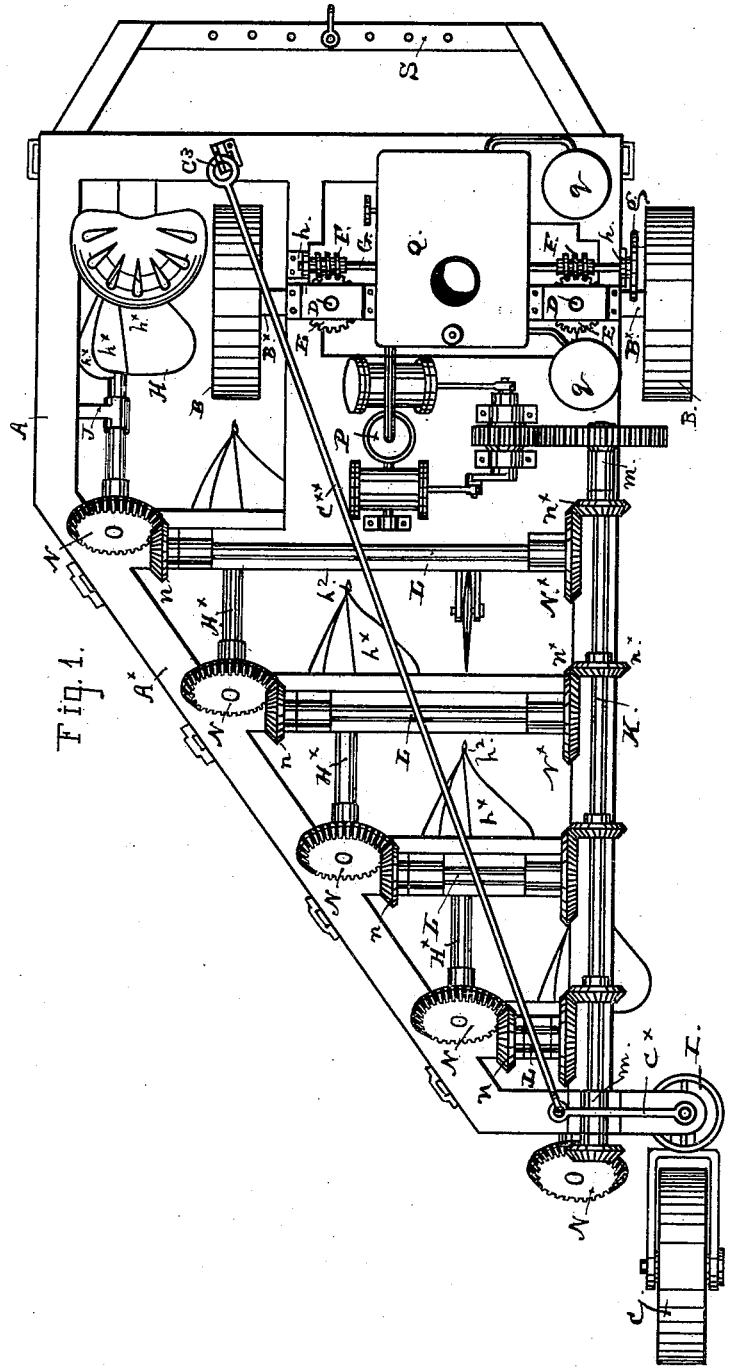

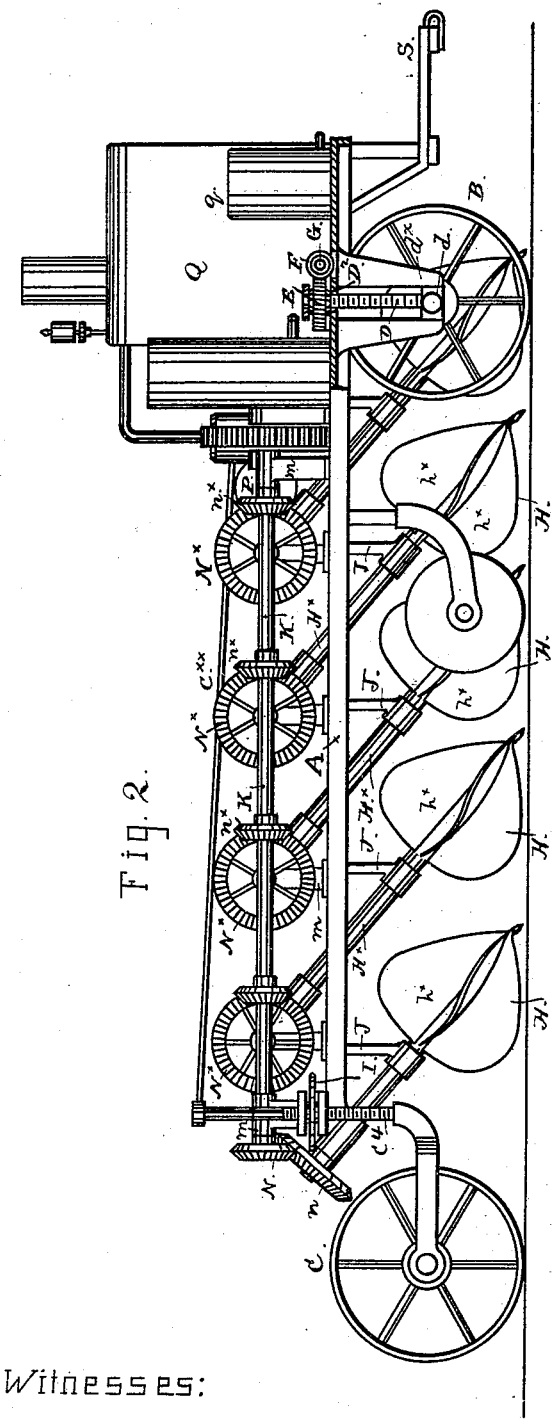

FREDERICK WITTRAM, OF SAN FRANCISCO, CALIFORNIA.

ROTARY PLOW.

SPECIFICATION forming part of Letters Patent No. 330,452, dated November 17, 1885.

Application filed July 20, 1885. Serial No. 172,174. (No model.)

*To all whom it may concern:*

Be it known that I, FREDERICK WITTRAM, a citizen of the United States, residing in the city and county of San Francisco, State of California, have invented certain new and useful Improvements in Rotary Plows; and I do hereby declare that the following is a full, clear, and exact description of the same, reference being had to the accompanying drawings.

My invention relates to improvements made in rotary plows or machines or implements for turning up and preparing the soil for sowing, in which the shares or cutters are rotated as they are drawn along through the ground.

The improvements embrace certain peculiar construction of rotary cutting and turning implement, and the combination of a set or number thereof in a gang upon a draft-frame, with an engine, engine-shaft, and motive power for giving continuous rotative movement to the gang as the frame is drawn along, suitable means being provided for regulating the penetration and depth of cut.

The following description fully explains the construction, combination, and arrangement of the parts producing an improved machine for the purpose.

In the accompanying drawings, referred to by figures and letters, Figure 1 is a plan or top view. Fig. 2 is a side elevation; Figs. 3 and 4, detail views of the rotary share, Fig. 3 being an end view from the rear or upper end, and Fig. 4 a side view.

A is a stiff frame formed of several beams and transverse bars and braces, and mounted on wheels B B C, of which the ones B at the front have the axle B' set in adjustable boxes $d\ d$, and the one, C, at the rear is a steering-wheel of the usual kind, with a tiller, $C^\times$, connected by a rod, $C^{\times\times}$, to a handle, $c^3$, at the front. The boxes $d$ are set in guides $d^\times$ on the frame, and are connected to the lower ends of upright screw-shafts D D, that work through rotary nuts $D^2$. Gears E E E F connect these screw-nuts with a horizontal shaft, G, extending across the frame, and a hand-wheel, $g$, on one end, is provided for turning this shaft. The bearings of the cross-shaft are seen at $h\ h$.

A means for regulating the height of the frame at the rear wheel consists of a hand-nut, I, and a threaded portion on the upright spindle $C^4$. Such means for raising and lowering the frame at the front and rear enable the depth of cut to be regulated as the conditions of work require, and also serve for elevating the shares above the surface in going to and from the field. The rotary shares H have blades or cutting and turning surfaces $h^\times$, that are concave in their cross-section and bent spirally in the longitudinal direction, the curvature being greatest at the outer edges of the blades and the twist being greatest at the point. At least three of these blades are fixed to a standard, $H^\times$, which is mounted in bearings in brackets I I on the frame in an inclined position, and is connected at the upper end to a driving-shaft by suitable gearing to receive continuous rotation, and each blade is either formed singly to be secured to and removed from the shaft $H^\times$, that forms the standard, or the whole set is made in one piece, with a hub or socket for the shaft. The point $h^2$, from which the blades spring, is a separate piece secured on the lower end of the shaft by such fastenings that will permit it to be removed for repairs, and a like attachment of the blades to the shaft that one can be taken off and replaced without affecting the others is to be preferred. The blades have the greatest twist at the point, as before stated, and from that end they run with a decreasing spiral along the shaft, but with an increase in width from point to heel, so that the edge is brought about parallel with the ground. The angle of forty-five degrees, or thereabout, is believed to be well adapted to all general character of work; but where the operations are confined to extremes of heavy close soil and light open soil the angle may be reduced or increased, as required by the conditions, in order to secure the best results. The width of the blades will be increased or diminished with the change made in the position of the shaft $H^\times$. The blades and point $h^2$ can be made in one piece, if desired. The driving-shaft K is set in bearings $m\ m$ along the frame, and the shafts $H^\times$ are connected to it by counter-shafts L L and gears N $n$ $N^\times$ $n^\times$, as seen in Fig. 1. This connection could also be made more directly by carrying the driving-shaft diagonally along the frame over the brace $A^\times$, and then gearing the shafts $H^\times$ directly into it. The gears and counter-shafts could thus be dispensed with; but their use on the other hand has the advantage of multiplying the power. The driving-shaft is connected to an engine, P, and a suitable boiler and furnace, Q, or other suitable power, is mounted on the frame over the front axle.

The furnace shown in the drawings is adapted to burn petroleum, the tanks $q\ q$ being provided for the purpose of carrying and supplying the liquid fuel. This power is employed altogether for driving the plows with a continuous motion, as the progression of the machine is effected by draft-animals hitched to the front, where a suitable clevis-bar, S, is provided. A broad-sower can be attached at the front or to the rear along the brace $A^\times$, or in its place a row of seed-drills can be fixed along the brace, and the machine then used for sowing and covering at the same operation.

Having thus fully described my invention, what I claim, and desire to secure by Letters Patent, is—

1. In a rotary plow, the revolving shafts $H^\times$, set obliquely to the line of progression, and having the spiral blades $h^\times$ and the separate detachable points $h^2$, substantially as shown and described.

2. In a rotary plow, the combination of the wheeled frame A, having connections for draft-power at the front, the engine P, engine-shaft K, extending to the rear, the obliquely-set plow-shafts $H^\times$ in line diagonally across the frame and geared into the engine-shaft, and the spiral shares H, secured to the oblique shaft, for operation as described.

3. The frame mounted at the front on wheels B B, which are set in vertically-adjustable boxes, and means for moving them, consisting of the screw-shafts D D and shaft G, with hand-wheel $g$, and supported at the rear end by steering-wheel C, the spindle $C^4$, tiller or crank $C^\times$, rod $C^{\times\times}$, and handle $C^3$, substantially as shown and described.

FREDERICK WITTRAM. [L. S.]

Witnesses:
LEWIS B. HARRIS,
LEONARD W. STORROR.